Sept. 1, 1964      E. B. ARENSON      3,146,489
AUTOMATIC FISH SCALING MACHINE
Filed Oct. 16, 1961      3 Sheets-Sheet 1
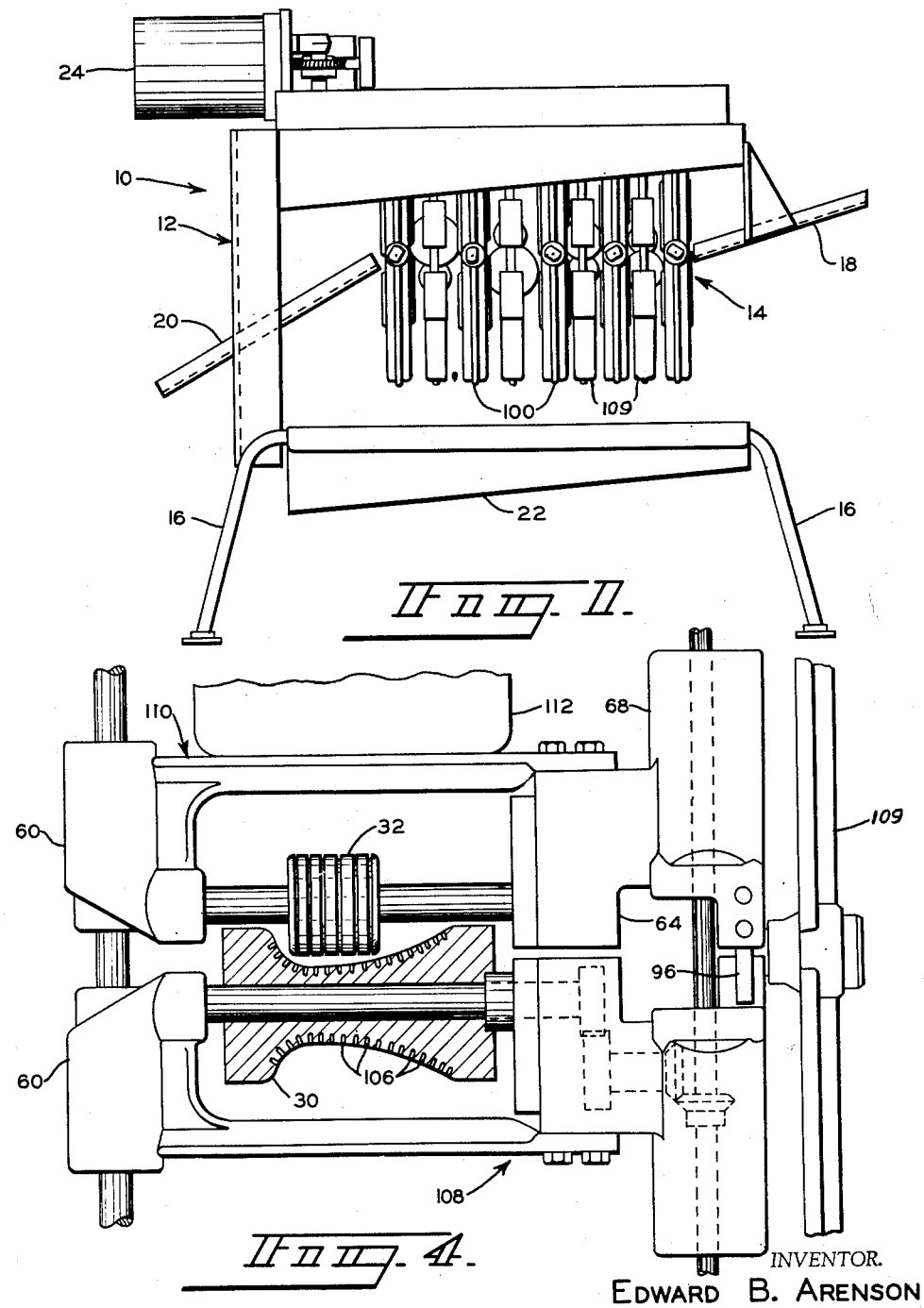
INVENTOR.
EDWARD B. ARENSON
BY
ATTORNEYS Sept. 1, 1964 E. B. ARENSON 3,146,489
AUTOMATIC FISH SCALING MACHINE
Filed Oct. 16, 1961 3 Sheets-Sheet 2
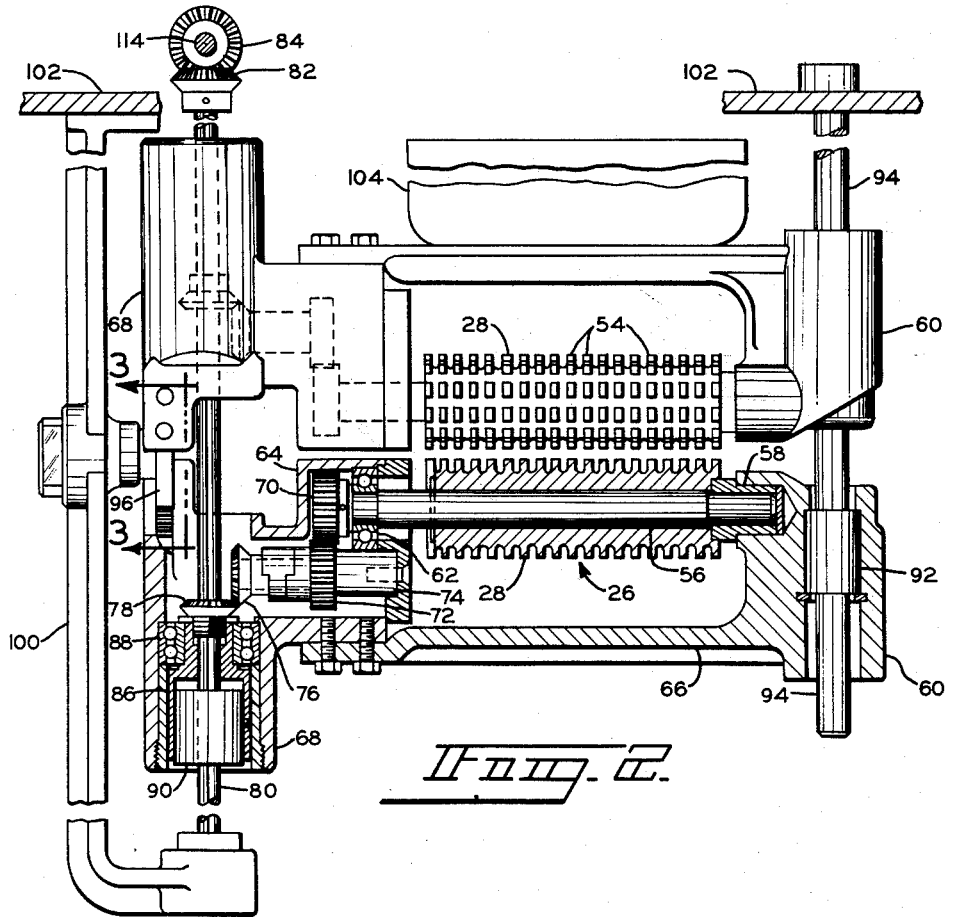
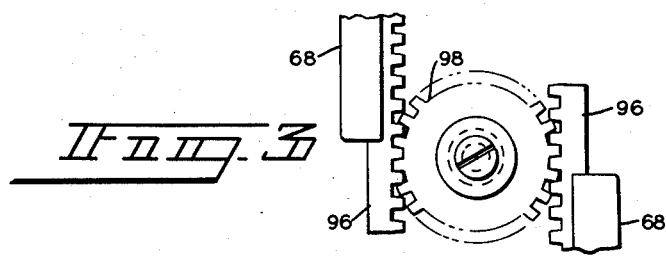
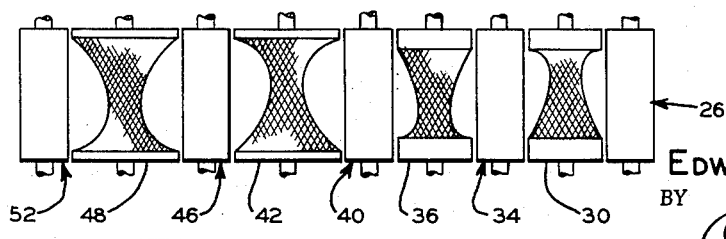
INVENTOR.
EDWARD B. ARENSON
BY
*Owen + Owen*
ATTORNEYS Sept. 1, 1964 E. B. ARENSON 3,146,489
AUTOMATIC FISH SCALING MACHINE
Filed Oct. 16, 1961 3 Sheets-Sheet 3
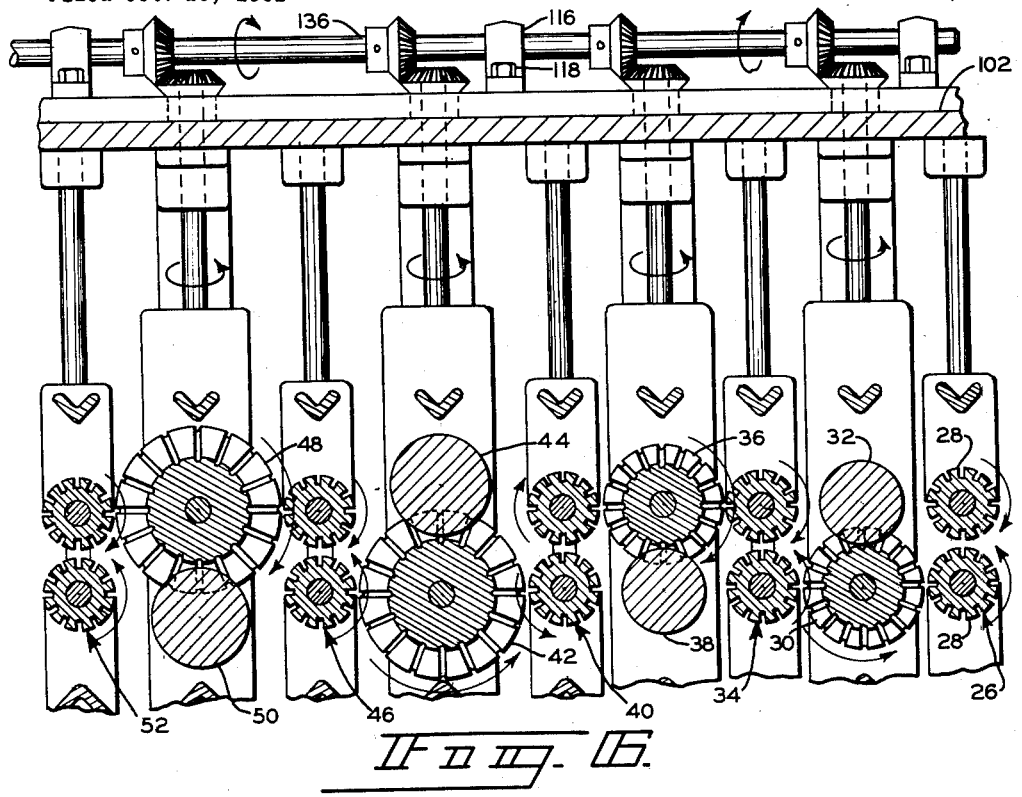
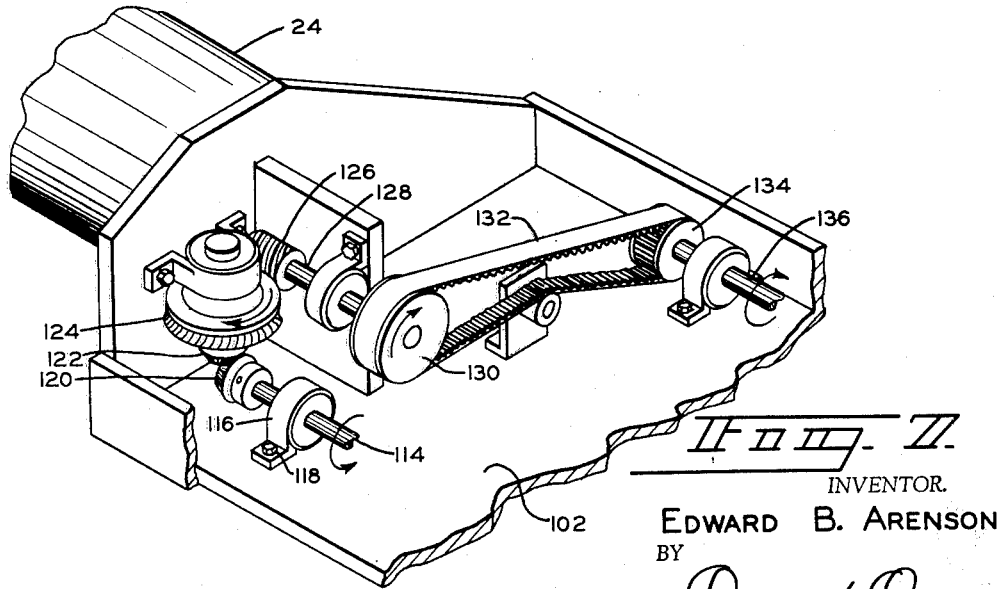
INVENTOR.
EDWARD B. ARENSON
BY
Owen & Owen
ATTORNEYS

United States Patent Office 3,146,489
Patented Sept. 1, 1964

3,146,489
AUTOMATIC FISH SCALING MACHINE
Edward B. Arenson, 3880 Brookside Road, Toledo, Ohio
Filed Oct. 16, 1961, Ser. No. 145,271
11 Claims. (Cl. 17—5)

This invention relates to an automatic fish scaling machine.

While many fish scaling machines have been proposed and several are in commercial use, the fish scaling machine of the present invention has a number of advantages not previously available. In particular, the new scaling machine employs more simple conveying means and more dependable drive and mounting mechanisms than those heretofore known. The new scaling machine thus needs less maintenance and is easier to clean, there being no conveyor chains or complex components to go out of order and from which scales and the like are hard to remove. The new scaling machine also is much more compact than those heretofore known and is capable of scaling fish at a very high rate of speed. Because of its compactness and dependability, the new scaling machine is readily adaptable for coin-operated applications.

It is, therefore, a principal object of the invention to provide an improved fish scaling machine having the advantages outlined above.

Other objects and advantages of the invention will be apparent from the following detailed description of a preferred embodiment thereof, reference being made to the accompanying drawing, in which:

FIG. 1 is a side view in elevation of a fish scaling machine embodying the principles of the invention;

FIG. 2 is an enlarged view in elevation, looking toward the left in FIG. 1, of a pair of controlling and conveying rollers used in the machine and drive mechanism therefor, with the lower half being shown in vertical cross section;

FIG. 3 is a detailed, fragmentary view in elevation taken along the line 3—3 of FIG. 2;

FIG. 4 is an enlarged view in elevation, looking toward the left in FIG. 1, of a scaler, a pressure roll, and drive mechanism, the scaler being shown in cross section;

FIG. 5 is a schematic plan view, on a scale larger than that of FIG. 1, of the layout of the various scalers and roller used in the scaling machine;

FIG. 6 is an enlarged, fragmentary view in vertical cross section taken longitudinally through the scaling machine as shows in FIG. 1, and FIG. 7 is an enlarged view in perspective of a portion of the drive mechanism for the scalers and rollers as seen when looking toward the left and rearwardly in FIG. 1.

Referring to the drawings, and more particularly to FIG. 1, an over-all fish scaling machine according to the invention indicated by the numeral 10 includes a main frame 12, a conveying and scaling unit indicated at 14, and legs 16. Fish to be scaled are placed in a feed trough 18 from which they travel through the unit 14 and are discharged down a rear trough 20. Most of the scales removed from the fish in the unit 14 are caught in an inclined basin 22 and can be easily hosed away. The unit 14 can also be hosed down quickly and without damage, with a drive motor 24 for the unit 14 being located thereabove and protected therefrom. Because of its compactness and dependable operation, as will be more apparent subsequently, the scaling machine 10 can be readily adapted for efficient coin-operated applications simply by enclosing the machine 10 and providing electric controls therefor as will be apparent to anyone skilled in the art of electrical circuit design.

The fish fed to the unit 14 first passes between a pair 26 (see FIG. 6) of controlling and conveying rollers 28 which grasp the fish and feed it at a relatively slow speed between a small, lower scaler 30 and a pressure roll or member 32, the scaler 30 rotating at a much faster speed than the rollers 28. The fish then passes between a second pair 34 of the controlling and conveying rollers 28 which feed the fish at the same rate of speed as the pair 26 between an upper, small scaler 36 and a lower pressure roll 38. The scalers 30 and 36 completely scale both sides of a smaller fish so that such fish are finished when they reach a middle pair 40 of the controlling and conveying rollers 28. However, all of the fish, large or small, continue from the pair 40 between a lower, large scaler 42 and an upper pressure roll 44. The fish are then engaged by a fourth pair 46 of the controlling and conveying rollers 28 and are fed between an upper, large scaler 48 and a lower pressure roll 50. The large scalers 42 and 48 completely scale both sides of a large fish so that all fish are completely scaled when they reach a last pair 52 of the controlling and conveying rollers 28.

With the over-all operation of the fish scaling machine 10 having been described, attention will now be directed to the individual components thereof. Referring more particularly to FIG. 2, the pair 26 of controlling and conveying rollers 28 is shown in elevation, with the lower roller 28 and its driving mechanism being shown in cross section. Each of the rollers 28 contains a plurality of projections 54 by means of which the fish can be more fully grasped or engaged with less slippage. These projections can be made by a plurality of circular and longitudinal grooves or cuts, as best shown in FIG. 2. The projections 54 are not pointed and do not injure the body of the fish passing between the rollers 28.

Not only are the rollers 28 the same, but the supporting and drive arrangements therefor are also similar; hence, only one need be described. Each of the rollers 28 is affixed to an axle 56, one end of which is rotatably mounted in a sleeve bearing 58 supported in an end housing 60 and the other end of which is rotatably mounted in a bearing 62 held by a gear housing 64. The two housings 60 and 64 are connected by a web 66 and these three components are functionally integral with a vertical housing 68. The roller 28 is driven through a spur gear 70 which is affixed to the axle 56 and which meshes with a drive spur gear 72 mounted on an axle 74 in turn rotated by a pair of bevel gears 76 and 78. The latter gear 78 is rotated by a vertical shaft 80 which is driven through a second pair of bevel gears 82 and 84. The bevel gear 78 is not affixed to the shaft 80 but is concentric therewith and is affixed to a supporting cylinder 86 which is rotatably mounted with respect to the housing 68 by a bearing 88. A Saginaw screw-type bearing 90 is affixed to the supporting cylinder 86 and drives it along with the spur gear 78, the balls of the bearing 90 fitting into grooves in the shaft 80 for rotational yet slidable movement therewith. Hence, the shaft 80 will drive the bearing 90 and the bevel gear 78 and yet the housing 68 and the associated components can move vertically with respect to the shaft 80. The end housing 60 also contains a Saginaw screw-type bearing 92 which enables the housing 60 to move freely vertically on a stationary guide rod 94.

With the above described arrangement, it will be readily understood that the controlling and conveying roller 28 can move vertically and yet maintain the axle 56 in a horizontal position, parallel to the axle of the other roller 28. During such movement, the roller 28 also is in constant driving engagement with the shaft 80. Thus, the rollers 28 can move apart as a fish moves therebetween and still continue to convey and control the movement of the fish. It is desirable that the rollers 28 move simultaneously and equally away from and toward one another so that a line bisecting the rollers will always remain fixed. In this manner, the path of the fish will remain the same whether the fish be fat or thin. To accomplish the symmetrical and simultaneous movement of the rollers 28, a rack and pinion arrangement is employed with the housings 68. Accordingly, a rack 96 (see FIG. 3 particularly) is affixed to the housing 68 of each of the roller assemblies and a pinion 98 is engaged with both of the racks 96, the pinion 98 being rotatably mounted on a bracket 100 (FIGS. 1 and 2) which is affixed to an upper supporting plate 102 (FIGS. 2 and 6) of the main frame 12. The bracket 100 also rotatably supports the lower end of the shaft 80.

Because the assemblies for the two rollers 28 of the pair 26 are similar and weigh substantially the same amount, the rollers 28 ordinarily would be urged neither toward nor away from one another and, once pushed apart by a fish, would ordinarily remain in a spaced position. Hence, the pair 26 would not properly engage the next fish fed to the unit 14. To urge the rollers 28 toward one another and to provide adequate engagement with a fish, a weight 104 is mounted on top of the web 66 of the upper roller drive assembly so that the force urging the upper assembly downwardly exceeds the force of the weight of the lower assembly, resulting in movement of both of the rollers 28 toward one another so that the pair 26 provides adequate engagement with the fish. The extent of this engagement can be varied simply by changing the amount of the weight 104. In a preferred form of the invention, the weight 104 actually constitutes a receptacle in which shot is placed, with more or less shot being used to vary the roller pressure. Springs can also be connected in tension between the assemblies to urge them toward one another. However, unlike weights, the springs tend to weaken after repeated movement. The remaining four pair of controlling and conveying rollers 34, 40, 46 and 52 are identical to the pair 26 and are not shown in detail.

Referring more particularly to FIG. 4, the first scaler 30 is shown with its drive mechanism in more detail. The scaler 30 is machined with a concave, asymmetrical portion, generally in the shape of the cross-sectional configuration of a body of a fish. The fact that the concave portion of the scaler 30 is similar to a fish body is not as important as is the fact that the deepest point on or smallest diameter of the scaler 30 is asymmetrical with respect to the concave portion and is to one side of the center line of the path of the fish. It has been found that this causes the fish to track better as it is fed through the unit 14 than if the deepest point or smallest diameter is centrally located longitudinally of the scaler 30. The scaler 30 has circular and longitudinally extending grooves or cuts which form teeth 106 of any suitable design. A scaler supporting and driving assembly 108 is substantially similar to the corresponding assembly for the rollers 28 and, hence, is not discussed in detail. The assembly 108 is supported by a bracket 109 similar to the bracket 100.

The pressure roll 32 is located above the scaler 30 with a portion of the pressure roll 32 being directly above the minimum diameter portion of the scaler 30. The roll 32 is preferably more narrow than the length of the concave portion of the scaler 30 so that a more direct force can be applied to a fish body to cause the lower surface of the body to spread more than if a wider pressure roll and a more general force were applied to the body. The pressure roll 32 also contains a number of circular grooves which held keep the body of the fish from moving longitudinally of the roll. The roll 32 is not driven but is simply rotatably mounted in a suitable supporting frame indicated at 110 which, in this instance, is made up of the end housing 60, the gear housing 64 (without the gears) and the vertical housing 68. The assembly 108 and the supporting frame 110 also are provided with the racks 96 and the pinion 98 (not shown in FIG. 4) which enable the scaler 30 and the pressure roll 32 to move simultaneously and equally away from and toward one another. In this manner, the path of a fish passing therebetween remains fixed, whether the fish be fat or thin. The supporting frame 110 in this instance also is provided with a weight 112 which causes pressure to be exerted on a fish between the roll 32 and the scaler 30. The weight 112 will vary for each of the scalers 30, 36, 42 and 48 and, for the large, upper scaler 48, no weight may be necessary at all, with the weight of the scaler 48 being sufficient to provide adequate pressure.

The drive shafts 80 for the controlling and conveying rollers 28 are driven by means of a shaft 114 (FIGS. 2 and 7) located above and parallel to the supporting plate 102 constituting part of the frame 12. The shaft 114, which is mounted on the plate 102 by bearing blocks 116 and bolts 118, is driven by another pair of bevel gears 120 and 122 with the latter being driven by a worm wheel 124 and a worm 126. The worm 126 is affixed to a shaft 128 of the motor 24 along with a drive sheave 130 which engages a timing belt 132 which, in turn, drives a sheave 134. The latter sheave is affixed to a shaft 136 (FIGS. 6 and 7) which drives the scalers 30, 36, 42 and 48 through their respective drive and support assemblies 108.

It will be appreciated that the scalers will be driven much faster than the controlling and conveying rollers because of the substantial gear reduction through the worm wheel 124 and the worm 126. In actual practice, the pairs 26, 34, 40, 46 and 52 of controlling and conveying rollers 28 have been driven at 85 r.p.m. and the scalers 30, 38, 42 and 48 have been driven at 2600 r.p.m. In this instance, the controlling and conveying rollers 28 had diameters of 1½ inches, the small scalers 30 and 36 had maximum diameters of 2¼ inches and the large scalers 42 and 48 had maximum diameters of 3½ inches. The small scalers 30 and 36 were 4 inches apart and the large scalers 42 and 48 were 5⅛ inches apart.

Because of the substantial difference in speed between the scalers and the controlling and conveying rollers, it is desirable that a fish passing through the unit 14 always be engaged by at least one pair of the controlling and conveying rollers. Otherwise, the scalers will propel the fish at an excessive rate of speed, when it is free of the controlling and conveying rollers, and cause physical damage to it when it hits the next pair of controlling and conveying rollers. In addition, the fish will not be properly scaled if it is kicked ahead by the scalers. As a practical matter, however, if the fish is slightly shorter than the distance between adjacent pairs of controlling and conveying rollers, effective scaling can still be accomplished because the teeth of the scaler will still scale the fish, even when not engaged by the rollers, until the momentum of the fish body is overcome and its speed increased to the point where the relative motion between the fish and the teeth is insufficient to cause scaling. Before this occurs, however, the fish will be engaged by the next pair of controlling and conveying rollers and will resume its relatively slow rate of travel, before its speed has been significantly increased.

Various modifications of the above described embodiment of the invention will be apparent to those skilled in the art and it is to be understood that such modifications can be made without departing from the scope of the invention if they are within the spirit and tenor of the accompanying claims.

I claim:

1. In a fish scaling machine, a supporting frame, a pair of rotatable, controlling and conveying rollers, means on said frame for supporting said rollers in parallel positions, means associated with said supporting means urging said rollers together, means on said frame for driving said rollers in opposite directions about their axes, a rotatable scaler, a pressure member, means on said frame for positioning said scaler generally parallel to said rollers for movement toward and away from said pressure member, means on said frame for rotating said scaler at a peripheral speed in excess of the peripheral speed of said rollers, means on said frame for mounting said pressure member for movement toward and away from said scaler, means associated with said mounting means urging said member toward said scaler and said scaler toward said pressure member, and means for equalizing movements of said scaler and said pressure member toward and away from one another.

2. A fish scaling machine according to claim 1 wherein the axes of said rollers and scaler are horizontally disposed.

3. A fish scaling machine according to claim 2 wherein said urging means for said pressure member and said scaler constitutes a weight associated with the upper one of said member and said scaler, with the combined weight of said weight and the upper one of said scaler and said member exceeding the weight of the lower one of said scaler and said member.

4. In a fish scaling machine, a frame, a first pair of controlling and conveying rollers, means on said frame for supporting said rollers with their axes horizontally disposed, means associated with said supporting means urging both of said rollers toward one another, means associated with said supporting means for driving said rollers in opposite directions about their own axes, a rotatable scaler having a concave portion longitudinally thereof, a pressure member, means on said frame supporting said scaler with its axis parallel to the axes of said rollers for movement toward and away from said pressure member, means for driving said scaler about its axis at a peripheral speed greatly in excess of the peripheral speed at which said rollers are driven, means on said frame supporting said member to one side of a path of a fish fed by said controlling and conveying rollers for movement toward and away from said scaler, with a line through said pressure member and the axis of said scaler being generally perpendicular to the path, means associated with said member-supporting means urging said pressure member toward said scaler and said scaler toward said pressure member, means for equalizing movement of said scaler and said pressure member toward and away from one another, a second pair of controlling and conveying rollers, means on said frame for supporting said second pair of controlling and conveying rollers with their axes generally horizontal and parallel to the axes of said first rollers, means associated with said second pair supporting means urging both of said rollers of said second pair toward one another, and means associated with said second pair supporting means for driving said rollers of said second pair in opposite directions about their own axes at a speed substantially equal to the speed of said first rollers.

5. In a fish scaling machine, a frame, a first pair of controlling and conveying rollers, first means on said frame for supporting said rollers with their axes horizontally disposed, first means associated with said supporting means urging both of said rollers toward one another, first means associated with said supporting means for driving said rollers in opposite directions about their own axes, a first rotatable scaler having an asymmetrical concave portion longitudinally thereof with the smallest diameter of said concave portion lying to one side of the center line of a normal path of a fish, means on said frame supporting said scaler, means associated with said frame for rotating said scaler about its axis at a peripheral speed greatly in excess of the peripheral speed of said rollers, a pressure member, means associated with said frame mounting said pressure member opposite said scaler with a line through said pressure member and the axis of said scaling body being perpendicular to a path of fish fed thereto by said controlling and conveying rollers, means associated with said pressure member for enabling movement of it toward and away from said first scaler, a second pair of controlling and conveying rollers, second means on said frame supporting said second pair of controlling and conveying rollers with their axes horizontal and parallel to the axes of said first rollers, second means associated with said second supporting means urging both of said second rollers toward one another, second means associated with said second supporting means for driving said second rollers in opposite directions about their own axes at a speed substantially equal to the speed of the first rollers, a second scaler on the side of said second pair of rollers opposite said first scaler and on the side of the path of the fish opposite said first scaler, said second scaler having a second, asymmetrical concave portion longitudinally thereof with the smallest diameter of said second concave portion lying on the side of the center line of the normal path of the fish opposite to the smallest diameter of the first concave portion, means associated with said frame for rotating said second scaler about its axis at a peripheral speed greatly in excess of the peripheral speed of said first and second pair of rollers, a second pressure member, means associated with said frame mounting said second pressure member opposite said second scaler with a line through said second pressure member and the axis of said second scaler being generally perpendicular to the path of the fish, and means associated with said second pressure member for enabling movement of said second member toward and away from said second scaler.

6. A scaling machine according to claim 5 and a third pair of controlling and conveying rollers, third means on said frame for supporting said third pair on the side of said second scaler opposite said second pair of controlling and conveying rollers, third means associated with said third supporting means urging both of said third rollers toward one another, and third means associated with said third supporting means for driving said third rollers in opposite directions about their own axes.

7. In a fish scaling machine, a frame, five pairs of controlling and conveying rollers, means associated with said frame supporting said five pairs in alignment, with the rollers of each pair being on opposite sides of a path of a fish to be fed through said machine, means associated with said supporting means urging both of the rollers of each of said five pairs toward one another, means associated with the urging means to cause the rollers of each of said five pairs to move toward and away from one another equal amounts whereby the path of the fish therebetween remains unchanged, four scalers, a pressure member associated with each of said scalers on the side of the path of the fish opposite the associated scaler, means enabling movement of said pressure members toward their associated scalers, means associated with said moving means for urging said pressure members toward said scalers, means on said frame supporting one of said scalers between each adjacent pairs of rollers and adjacent the path to scale a side of a fish conveyed along the path by said rollers, and means associated with said frame for rotating said scalers at a peripheral speed greatly in excess of the peripheral speed of said rollers, the first two scalers between the first and second and between the second and third pairs of rollers lying on opposite sides of the path of the fish and being of equal size, the last two scalers between the third and fourth and between the fourth and fifth pairs of rollers lying on opposite sides of the path of the fish and being equal size, one of the pair of scalers being substantially larger than the other pair of scalers whereby said scalers can fit with and scale fish of widely varying width and girth.

8. In a fish scaling machine, a supporting frame, a pair of rotatable, controlling and conveying rollers, means on said frame for supporting said rollers in parallel positions, a rotatable scaler, a non-scaling pressure member having a length substantially shorter than said scaler, means on said frame for positioning said scaler generally parallel to said rollers, means on said frame mounting said pressure member for movement toward and away from said scaler with the axes of said pressure member and said scaler being substantially parallel, and means associated with said mounting means urging said member toward said scaler.

9. A fish scaling machine according to claim 8 wherein said mounting means for said pressure member includes means enabling said pressure member to rotate freely and independently of said scaler.

10. A fish scaling machine according to claim 8 wherein said scaler has an asymmetrical concave portion and said pressure member is shorter than said concave portion.

11. In a fish scaling machine, a supporting frame, a pair of rotatable, parallel controlling and conveying rollers, an axle for each of said rollers, a guide rod located near first ends of the axles, a drive shaft located near second, opposite ends of the axles, said drive shaft being parallel to said guide rod, with both said shaft and said rod lying in a plane parallel to a plane through said axles, means slidably supporting the first ends of the axles on said guide rod, means slidably supporting the second ends of the axles on said drive shaft, gear means associated with each of said axles and movable therewith, and additional gear means rotatable with said drive shaft and movable with said slidably supporting means for said second ends whereby said second gear means will be engageable with said first gear means for all positions of said axles, and means for driving said drive shaft.

References Cited in the file of this patent
UNITED STATES PATENTS

| | | |
|---|---|---|
| 1,294,140 | Montgomery | Feb. 11, 1919 |
| 2,532,198 | Savrda | Nov. 28, 1950 |